United States Patent
Johnson et al.

(10) Patent No.: US 7,217,453 B2
(45) Date of Patent: May 15, 2007

(54) COMPOSITE LAMINATE STRUCTURE

(75) Inventors: David W Johnson, San Diego, CA (US); Scott A. Garrett, San Diego, CA (US); Stephen G. Moyers, Jamul, CA (US)

(73) Assignee: Ebert Compoistes Corporation, Chula Visa, CA (US)

( * ) Notice: Subject to any disclaimer, the term of this patent is extended or adjusted under 35 U.S.C. 154(b) by 0 days.

(21) Appl. No.: 10/744,630

(22) Filed: Dec. 23, 2003

(65) Prior Publication Data

US 2004/0137231 A1    Jul. 15, 2004

Related U.S. Application Data

(63) Continuation of application No. 10/059,956, filed on Nov. 19, 2001, now Pat. No. 6,676,785.

(60) Provisional application No. 60/298,523, filed on Jun. 15, 2001, provisional application No. 60/281,838, filed on Apr. 6, 2001, provisional application No. 60/293,939, filed on May 29, 2001.

(51) Int. Cl.
*D04H 1/00* (2006.01)
*B32B 27/04* (2006.01)

(52) U.S. Cl. .................. 428/292.1; 428/298.1

(58) Field of Classification Search ............ 428/309.9, 428/71, 317.9, 119, 86, 112, 223, 292.1, 298.1, 428/85
See application file for complete search history.

(56) References Cited

U.S. PATENT DOCUMENTS

| | | |
|---|---|---|
| 2,762,739 A | 9/1956 | Weiss |
| 2,954,001 A | 9/1960 | Luxenburg |
| 3,211,115 A | 10/1965 | Burillon et al. |

(Continued)

FOREIGN PATENT DOCUMENTS

DE     4342575 A1    4/1995

(Continued)

OTHER PUBLICATIONS

Stanley et al., Development and Evaluation of Stitched Sandwich Panels, NASA-CR 2001-211025, Jun. 2001.

(Continued)

*Primary Examiner*—N. Edwards
(74) *Attorney, Agent, or Firm*—Stephen C. Beuerle; Procopio Cory Hargreaves & Savitch LLP

(57) ABSTRACT

A method and apparatus for forming an improved pultruded and clinched Z-axis fiber reinforced composite laminate structure. The upper and lower skins and the core are pulled automatically through tooling where the skin material is wetted-out with resin and the entire composite laminate is preformed in nearly its final thickness. The preformed composite laminate continues to be pulled into an automatic 3-dimensional Z-axis fiber deposition machine that deposits "groupings of fiber filaments" at multiple locations normal to the plane of the composite laminate structure and cuts each individual grouping such that an extension of each "grouping of fiber filaments" remains above the upper skin and below the lower skin. The preformed composite laminate then continues to be pulled into a secondary wet-out station. Next the preformed composite laminate travels into a pultrusion die where the extended "groupings of fiber filaments" are all bent over above the top skin and below the bottom skin producing a superior clinched Z-axis fiber reinforcement as the composite laminate continues to be pulled, catalyzed, and cured at the back section of the pultrusion die. The composite laminate continues to be pulled by grippers that then feed it into a gantry CNC machine that is synchronous with the pull speed of the grippers and where computerized machining, drilling, and cutting operations take place. This entire method is accomplished automatically without the need for human operators.

22 Claims, 4 Drawing Sheets

U.S. PATENT DOCUMENTS

| | | | |
|---|---|---|---|
| 3,230,995 A * | 1/1966 | Shannon | 156/166 |
| 3,241,508 A | 3/1966 | Chezaud et al. | |
| 3,328,218 A | 6/1967 | Noyes | |
| 3,647,606 A | 3/1972 | Notaro | |
| 3,761,345 A | 9/1973 | Smith | |
| 3,833,695 A | 9/1974 | Vidal | |
| 3,837,985 A | 9/1974 | Chase | |
| 3,870,580 A | 3/1975 | Belcher | |
| 3,948,194 A | 4/1976 | Gunold | |
| 3,993,523 A | 11/1976 | Hunt et al. | |
| 4,032,383 A | 6/1977 | Goldsworthy et al. | |
| 4,059,468 A | 11/1977 | Bouillon | |
| 4,077,340 A | 3/1978 | Braum et al. | |
| 4,080,915 A | 3/1978 | Bompard et al. | |
| 4,196,251 A | 4/1980 | Windecker | |
| 4,206,895 A | 6/1980 | Olez | |
| 4,218,276 A | 8/1980 | King | |
| 4,256,790 A | 3/1981 | Lackman et al. | |
| 4,291,081 A | 9/1981 | Olez | |
| 4,299,871 A | 11/1981 | Forsch | |
| 4,331,091 A | 5/1982 | Parker et al. | |
| 4,335,176 A | 6/1982 | Baumann | |
| 4,402,778 A | 9/1983 | Goldsworthy | |
| 4,420,359 A | 12/1983 | Goldsworthy | |
| 4,495,231 A | 1/1985 | Laskaris et al. | |
| 4,495,235 A | 1/1985 | Tesch | |
| 4,498,941 A | 2/1985 | Goldsworthy | |
| 4,506,611 A | 3/1985 | Parker et al. | |
| 4,528,051 A | 7/1985 | Heinze et al. | |
| 4,541,349 A | 9/1985 | Inoue | |
| 4,571,355 A | 2/1986 | Elrod | |
| 4,628,846 A | 12/1986 | Vives | |
| 4,752,513 A | 6/1988 | Rau et al. | |
| 4,761,871 A | 8/1988 | O'Conner et al. | |
| 4,808,461 A | 2/1989 | Boyce et al. | |
| 4,854,250 A | 8/1989 | Stuvecke et al. | |
| 4,913,937 A | 4/1990 | Engdahl et al. | |
| 4,917,756 A | 4/1990 | Cahuzac et al. | |
| 4,955,123 A | 9/1990 | Lawton et al. | |
| 4,963,408 A | 10/1990 | Huegli | |
| 4,983,453 A | 1/1991 | Beall | |
| 5,055,242 A | 10/1991 | Vane | |
| 5,095,833 A | 3/1992 | Darrieux | |
| 5,186,776 A | 2/1993 | Boyce et al. | |
| 5,286,320 A | 2/1994 | McGrath et al. | |
| 5,314,282 A | 5/1994 | Murphy et al. | |
| 5,324,377 A | 6/1994 | Davies | |
| 5,327,621 A | 7/1994 | Yasui et al. | |
| 5,333,562 A | 8/1994 | LeMaire et al. | |
| 5,361,483 A | 11/1994 | Rainville et al. | |
| 5,373,796 A | 12/1994 | Besemann | |
| 5,429,853 A | 7/1995 | Darrieux | |
| 5,445,693 A | 8/1995 | Vane | |
| 5,445,860 A | 8/1995 | Bova | |
| 5,445,861 A | 8/1995 | Newton et al. | |
| 5,466,506 A | 11/1995 | Freitas et al. | |
| 5,490,602 A | 2/1996 | Wilson et al. | |
| 5,549,771 A | 8/1996 | Brooker | |
| 5,580,514 A | 12/1996 | Farley | |
| 5,589,015 A | 12/1996 | Fusco et al. | |
| 5,589,243 A | 12/1996 | Day | |
| 5,624,622 A * | 4/1997 | Boyce et al. | 264/258 |
| 5,632,844 A | 5/1997 | Pate et al. | |
| 5,639,410 A | 6/1997 | Amaike et al. | |
| 5,642,679 A | 7/1997 | Monget et al. | |
| 5,667,859 A | 9/1997 | Boyce et al. | |
| 5,681,408 A | 10/1997 | Pate et al. | |
| 5,736,222 A | 4/1998 | Childress | |
| 5,741,574 A * | 4/1998 | Boyce et al. | 428/119 |
| 5,759,321 A | 6/1998 | Cahuzac | |
| 5,770,155 A | 6/1998 | Dunphy et al. | |
| 5,778,806 A | 7/1998 | Badillo | |
| 5,789,061 A | 8/1998 | Campbell et al. | |
| 5,809,805 A * | 9/1998 | Palmer et al. | 66/84 A |
| 5,827,383 A | 10/1998 | Campbell et al. | |
| 5,829,373 A | 11/1998 | Baxter | |
| 5,832,594 A | 11/1998 | Avila | |
| 5,834,082 A | 11/1998 | Day | |
| 5,862,975 A | 1/1999 | Childress | |
| 5,863,635 A | 1/1999 | Childress | |
| 5,868,886 A | 2/1999 | Alson et al. | |
| 5,869,165 A | 2/1999 | Rorabaugh et al. | |
| 5,873,973 A | 2/1999 | Koon et al. | |
| 5,876,540 A | 3/1999 | Pannell | |
| 5,876,652 A | 3/1999 | Rorabaugh et al. | |
| 5,876,832 A | 3/1999 | Pannell | |
| 5,882,756 A | 3/1999 | Alston et al. | |
| 5,882,765 A | 3/1999 | Pastureau et al. | |
| 5,916,469 A | 6/1999 | Scoles et al. | |
| 5,919,413 A | 7/1999 | Avila | |
| 5,935,475 A | 8/1999 | Scoles et al. | |
| 6,132,859 A | 10/2000 | Jolly | |
| 6,151,439 A | 11/2000 | Wainwright | |
| 6,454,889 B1 | 9/2002 | Hendrix et al. | |
| 6,632,309 B1 | 10/2003 | Hendrix et al. | |
| 6,645,333 B2 | 11/2003 | Johnson et al. | |
| 2002/0144767 A1 | 10/2002 | Johnson et al. | |

FOREIGN PATENT DOCUMENTS

| | | |
|---|---|---|
| GB | 1275705 | 6/1970 |
| GB | 2245862 | 1/1992 |
| JP | 5-200884 A | 10/1993 |
| JP | 63-60738 A | 3/1998 |
| WO | WO 92/00845 A1 | 1/1992 |
| WO | WO 98/08271 | 2/1998 |
| WO | WO 03/011576 A1 | 2/2003 |

OTHER PUBLICATIONS

Martin, et al. "Pultrusion," Engineered Materials Handbook, vol. 1, Composites, ASM International, 1989, pp. 533-543.

Gabriele, M., "Pultrusion's Promise," Plastics Technology, Mar. 1995, pp. 36-40.

* cited by examiner

COMPOSITE LAMINATE STRUCTURE

REFERENCE TO RELATED APPLICATION

This application is a continuation of U.S. patent application Ser. No. 10/059,956 filed Nov. 19, 2001 now U.S. Pat. No. 6,676,785, which claims priority to provisional patent application 60/298,523 filed on Jun. 15, 2001; provisional patent application 60/281,838 filed on Apr. 6, 2001; and provisional patent application 60/293,939 filed on May 29, 2001.

This invention was made with United States Government support under Cooperative Agreement 70NANB8H4059 awarded by NIST. The United States Government has certain rights in the invention.

TECHNICAL FIELD

The present invention relates to an improvement in the field of composite laminate structures known as sandwich structures formed with outside skins of a polymer matrix composite and an internal core of either foam, end-grain balsa wood, or honeycomb, and more specifically to the field of these sandwich structures which additionally have some type of Z-axis fiber reinforcement through the composite laminate and normal to the plane of the polymer matrix composite skins.

BACKGROUND ART

There is extensive use in the transportation industry of composite laminate structures due to their lightweight and attractive performance. These industries include aerospace, marine, rail, and land-based vehicular. The composite laminate structures are made primarily from skins of a polymer matrix fiber composite, where the matrix is either a thermoset or thermoplastic resin and the fiber is formed from groupings of fiber filaments of glass, carbon, aramid, or the like. The core is formed from end-grain balsa wood, honeycomb of metallic foil or aramid paper, or of a wide variety of urethane, PVC, or phenolic foams, or the like.

Typical failures in laminate structure can result from core failure under compressive forces or in shear or, most commonly, from a failure of the bond or adhesive capability between the core and the composite skins (also known as face sheets). Other failures, depending on loading may include crimpling of one or both skins, bending failure of the laminate structure, or failure of the edge attachment means from which certain loads are transferred to the laminate structure.

Certain patents have been granted for an art of introducing reinforcements that are normal to the planes of the skins, or at angles to the normal (perpendicular) direction. This is sometimes called the "Z" direction as it is common to refer to the coordinates of the laminate skins as falling in a plane that includes the X and Y coordinates. Thus the X and Y coordinates are sometimes referred to as two-dimensional composite or 2-D composite. This is especially appropriate as the skins are many times made up of fiber fabrics that are stitched or woven and each one is laid on top of each other forming plies or layers of a composite in a 2-D fashion. Once cured these 2-D layers are 2-D laminates and when failure occurs in this cured composite, the layers typically fail and this is known as interlaminar failure.

The patents that have been granted that introduce reinforcements that are normal to the X and Y plane, or in the generally Z-direction, are said to be introducing reinforcements in the third dimension or are 3-D reinforcements. The purpose of the 3-D reinforcement is to improve the physical performance of the sandwich structure by their presence, generally improving all of the failure mechanisms outlined earlier, and some by a wide margin. For example, we have shown that the compressive strength of a foam core laminate structure with glass and vinyl ester cured skins can be as low as 30 psi. By adding 16 3-D reinforcements per square inch, that compressive strength can exceed 2500 psi. This is an 83 times improvement.

Childress in U.S. Pat. No. 5,935,680, Boyce et al in U.S. Pat. No. 5,741,574 as well as Boyce et al in U.S. Pat. No. 5,624,622 describe Z-directional reinforcements that are deposited in foam by an initial process and then secondarily placed between plies of fiber fabric and through heat and pressure, the foam crushes or partially crushes forcing the reinforcements into the skin. Practically, these reinforcements are pins or rods and require a certain stiffness to be forced into the skin or face layers. Although Boyce et al describes "tow members" as the Z-directional reinforcement, practically, these are cured tow members, or partially cured tow members that have stiffness. As Boyce et al describes in U.S. Pat. No. 5,624,622, compressing the foam core will "drive" the tow members into the face sheets. This cannot be possible unless the Z-directional or 3-D reinforcements are cured composite or metallic pins.

A standard roll of fiberglass roving from Owens Corning, typically comes in various yields (of yards per pound weight) and a yield of 113 would contain on a roll or doft 40 lbs. of 113 yield rovings. In the uncured state, these rovings are multiple filaments of glass fiber, each with a diameter of less than 0.0005 inches. The roving, uncured as it comes from Owens Corning, is sometimes called a "tow", contains hundreds of these extremely small diameter filaments. These hundreds of filaments shall be referred to as a "grouping of fiber filaments." These groupings of fiber filaments can sometimes be referred to, by those skilled in the art, as tows. It is impossible to drive a virgin glass fiber tow, or grouping of fiber filaments, as it is shipped from a glass manufacturer such as Owens Corning, through a face sheet. The grouping of fiber filaments will bend and kink and not be driven from the foam carrier into the skin or face sheets as described by Boyce et al. Therefore, the "tow" described by Boyce et al must be a rigid pin or rod in order for the process to work as described. It will be shown that the present invention allows easily for the deposition of these groupings of fiber filaments, completely through the skin-core-skin laminate structure, a new improvement in this field of 3-D reinforced laminate structures.

This issue is further verified by an earlier patent of Boyce et al, U.S. Pat. No. 4,808,461, in which the following statement is made: "The material of the reinforcing elements preferably has sufficient rigidity to penetrate the composite structure without buckling and may be an elemental material such as aluminum, boron, graphite, titanium, or tungsten." This particular referenced patent depends upon the core being a "thermally decomposable material". Other U.S. patents that are included herein by reference are: Boyce et al, U.S. Pat. No. 5,186,776; Boyce et al U.S. Pat. No. 5,667,859; Campbell et al U.S. Pat. No. 5,827,383; Campbell et al U. S. Pat. No. 5,789,061; Fusco et al. U.S. Pat. No. 5,589,051.

None of the referenced patents indicate that the referenced processes can be automatic and synchronous with pultrusion, nor do they state that the processes could be synchro nous and in-line with pultrusion. Day describes in U.S. Pat. Nos. 5,589,243 and 5,834,082 a process to make a combination foam and uncured glass fabric core that is later molded. The glass fiber in the core never penetrates the skins of the laminate and instead fillets are suggested at the interface of the interior fiber fabric and the skins to create a larger resin fillet. This is a poor way to attempt to tie the core to the skins, as the fillet will be significantly weaker than if the interior fiber penetrated the skins. Day has the same problem that Boyce et al have as discussed earlier. That is, the interior uncured fabric in Day's patent is limp and cannot be "driven" into the skins or face sheets without being rigid. Thus the only way to take preinstalled reinforcements in foam, and then later mold these to face sheets under pressure, and further have the interior fiber forced into the skins, is to have rigid reinforcements, such as rigid pins or rods or, as in Day's case, rigid sheets.

Boyce et al in U.S. Pat. No. 5,186,776 depends on ultrasound to insert a fiber through a solid laminate that is not a sandwich structure. This would only be possible with a thermoplastic composite that is already cured and certain weaknesses develop from remelting a thermoplastic matrix after the first solidification. Ultrasound is not a requirement of the instant invention as new and improved means for depositing groups of fiber filaments are disclosed. U.S. Pat. No. 5,869,165 describes "barbed" 3-D reinforcements to help prevent pullout. The instant invention has superior performance in that the 3-D groups of fiber filaments are extended beyond the skins on both sides of the composite laminate, such that a riveting, or clinching, of the ends of the filaments occurs when the ends of the filaments are entered into the pultrusion die and cured "on-the-fly." The clinching provides improved pull-out performance, much in the same way as a metallic rivet in sheet metal, that is clinched or bent over on the ends, improves the "pull-out" of that rivet versus a pin or a bonded pin in sheet metal. This is different from the current state-of-the-art. Fiber through the core is either terminated at the skins, unable to penetrate the skins, or as pure rods penetrates part or all of the skin, but is not riveted or clinched. And many of the techniques referenced will not work with cores that don't crush like foam. For example, the instant invention will also work with a core such as balsa wood, which will not crush and thus cannot "drive" cured rods or pins into a skin or face sheet. Furthermore, the difficult, transition from a composite laminate structure to an edge can easily be accommodated with the instant invention. As will be shown later, a composite laminate structure can be pultruded with clinched 3-D groupings of fiber filaments and at the same time the edges of the pultruded composite laminate can consist of solid composite with the same type and quantity of 3-D grouping of fiber filaments penetrating the entire skin-central composite-skin interface. As will be shown, the skins can remain continuous and the interior foam can transition to solid composite laminate without interrupting the pultrusion process.

It is an object of this invention to provide a low cost alternative to the current approaches such that the composite laminate structure can find its way into many transportation applications that are cost sensitive. All prior art processes referenced have a degree of manual labor involved and have been only successful to date where aerospace is willing to pay the costs for this manual labor. The instant invention is fully automatic and thus will have extremely low selling prices. For example, earlier it was mentioned that by adding a certain number of groups of fiber filaments to a foam core composite laminate that the compressive strength improved from 30 psi to over 2500 psi. This can be achieved for only $0.30 per square foot cost. None of the existing processing techniques referenced can compare to that performance-to-cost ratio. This can be achieved due to the automated method of forming the composite laminate structure. Other differences and improvements will become apparent as further descriptions of the instant invention are given.

SUMMARY OF INVENTION

The method and apparatus for forming an improved pultruded and clinched Z-axis fiber reinforced composite structure starts with a plurality of upper and lower spools that supply raw material fibers that are formed respectively into upper and lower skins that are fed into a primary wet-out station within a resin tank. A core material is fed into the primary wet-out station between the respective upper and lower skins to form a composite laminate preform. The upper and lower skins and the core are pulled automatically through tooling where the skin material is wetted-out with resin and the entire composite laminate is preformed in nearly its final thickness. The composite laminate preform continues to be pulled into an automatic 3-dimensional Z-axis fiber deposition machine that deposits "groupings of fiber filaments" at multiple locations normal to the plane of the composite laminate structure and cuts individual groups such that an extension of each "grouping of fiber filaments" remains above the upper skin and below the lower skin.

The preformed composite laminate then continues to be pulled into a secondary wet-out station. Next the preformed composite laminate is pulled through a pultrusion die where the extended "groupings of fiber filaments" are all bent over above the top skin and below the bottom skin producing a superior clinched Z-axis fiber reinforcement as the composite laminate continues to be pulled, catalyzed and cured at a back section of the pultrusion die. The composite laminate continues to be pulled by grippers that then feed it into a gantry CNC machine that is synchronous with the pull speed of the grippers and where computerized machining, drilling and cutting operations take place. The entire process is accomplished automatically without the need for human operators.

It is an object of the invention to provide a novel improved composite laminate structure that has riveted or clinched 3-D groupings of fiber filaments as part of the structure to provide improved resistance to delaminating of the skins or delaminating of the skins to core structure.

It is also an object of the invention to provide a novel method of forming the composite laminate structure wherein an automatic synchronous pultrusion process is utilized, having raw material, for example glass fabric such as woven roving or stitched glass along with resin and core material pulled in at the front of a pultrusion line and then an automatic deposition station places 3-D Z-axis groupings of fiber filaments through a nearly net-shape sandwich preform and intentionally leaves these groupings longer than the thickness of the sandwich structure, with an extra egress. This is then followed by an additional wet-out station to compliment an earlier wet-out station. The preform then is pulled into a pultrusion die and is cured on the fly and the 3-D Z-axis groupings of fiber filaments are riveted, or clinched, in the die to provide a superior reinforcement over the prior art. The cured composite laminate structure is then fed into a traveling CNC work center where final fabrication, machining operations, milling, drilling, and cut-off occur.

This entire operation is achieved with no human intervention.

It is another object of the invention to utilize core materials that do not require dissolving or crushing as previous prior art methods require.

It is a further an object of the invention to provide a novel pultruded panel that can be continuous in length, capable of 100 feet in length or more and with widths as great as 12 feet or more.

It is an additional object of the invention to produce a 3-D Z-axis reinforced composite laminate structure wherein the edges are solid 3-D composite to allow forming of an attachment shape or the machining of a connection.

It is another object of the invention to provide a preferred embodiment of a temporary runway, taxiway, or ramp for military aircraft. This composite laminate structure would replace current heavier aluminum structure, (known as matting) and could easily be deployed and assembled. The 3-D Z-axis reinforcements ensure the panels can withstand the full weight of aircraft tire loads, yet be light enough for easy handling.

DESCRIPTION OF PREFERRED EMBODIMENT

Figure 1:
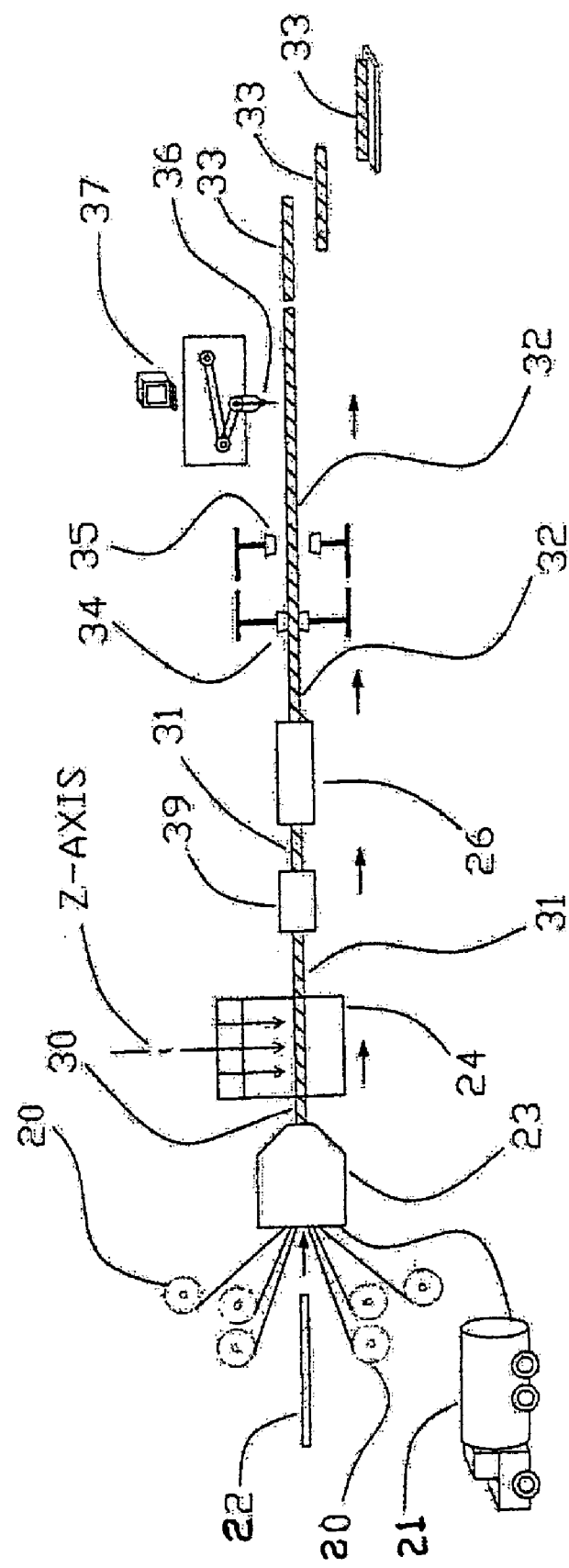
FIG. 1 is a schematic illustration of a method and apparatus for forming continuously and automatically the subject 3-D Z-axis reinforced composite laminate structure.

FIG. 1 illustrates a method and application for forming a pultruded and clinched 3-D Z-axis fiber reinforced composite laminate structure. The pultrusion direction is from left-to-right in FIG. 1 as shown by the arrows. The key components of the apparatus will become evident through the following description.

Shown in FIG. 1 are the grippers 34 and 35. These are typically hydraulically actuated devices that can grip a completely cured composite laminate panel 32 as it exits pultrusion die 26. These grippers operate in a hand-over-hand method. When gripper 34 is clamped to the panel 32, it moves a programmed speed in the direction of the pultrusion, pulling the cured panel 32 from the die 26. Gripper 35 waits until the gripper 34 has completed its full stroke and then takes over.

Upstream of these grippers, the raw materials are pulled into the die in the following manner. It should be recognized that all of the raw material is virgin material as it arrives from various manufacturers at the far left of FIG. 1. The fiber 20 can be glass fiber, either in roving rolls with continuous strand mat or it can be fabric such as x-y stitched fabric or woven roving. Besides glass, it can be carbon or aramid or other reinforcing fiber. A core material 22 is fed into the initial forming of the sandwich preform. The skins of the sandwich will be formed from the layers of fiber 20 on both the top and bottom of the sandwich preform 30. The core 22 will be the central section of the sandwich. The core can be made of urethane or PVC foam, or other similar foams in densities from 2 lbs. per cubic foot to higher densities approaching 12 lbs. per cubic foot. Alternatively core 22 could be made of end-grain balsa wood having the properties of 6 lb. per cubic foot density to 16 lb. per cubic foot.

The raw materials are directed, automatically, in the process to a guidance system in which resin from a commercial source 21 is directed to a primary wet-out station within resin tank 23. The wetted out preform 30 exits the resin tank and its debulking station in a debulked condition, such that the thickness of the panel section 30 is very nearly the final thickness of the ultimate composite laminate. These panels can be any thickness from 0.25 inches to 4 inches, or more. The panels can be any width from 4 inches wide to 144 inches wide, or more. Preform 30 is then directed to the Z-axis fiber deposition machine 24 that provides the deposition of 3-D Z-axis groupings of fiber filaments. The details as to how Z-axis filter deposition machine 24 functions is the subject of the referenced provisional patent application 60/293,939 and U.S. patent application Ser. No. 09/922,053 filed Aug. 2, 2001 is incorporated into this patent application by reference. This system is computer controlled so that a wide variety of insertions can be made. Machine 24 can operate while stationary or can move synchronously with the gripper 34 speed. Groupings of fiber filaments are installed automatically by this machine into the preform 31 that is then pulled from the Z-axis fiber deposition machine 24. Preform 31 has been changed from the preform 30 by only the deposition of 3-D Z-axis groupings of fiber filaments, all of which are virgin filaments as they have arrived from the manufacturer, such as Owens Corning.

Modified preform 31 of FIG. 1 now automatically enters a secondary wet-out station 39. Station 39 can be the primary wet-out, eliminating station 23, as an alternative method. This station helps in the completion of the full resin wet-out of the composite laminate structure, including the 3-D Z-axis groupings of fiber filaments. Preform 31 then enters pultrusion die 26 mentioned earlier and through heat preform 31 is brought up in temperature sufficiently to cause catalyzation of the composite laminate panel. Exiting die 26 is the final cured panel section 32 which is now structurally strong enough to be gripped by the grippers 34 and 35.

The sandwich structure of FIG. 1 can then be made any length practicable by handling and shipping requirements. Downstream of the grippers 34 and 35, the preform 32 is actually being "pushed" into the downstream milling machine system, 36 and 37. Here a multi-axis CNC machine (computer numerical control) moves on a gantry synchronous with the gripper pull speed, and can machine details into the composite laminate structure/panel on the fly. These can be boltholes, edge routing, milling, or cut-off. The machine 36 is the multi-axis head controlled by the computer 37. After cut-off, the part 33 is removed for assembly or palletizing and shipping.

Figure 2:
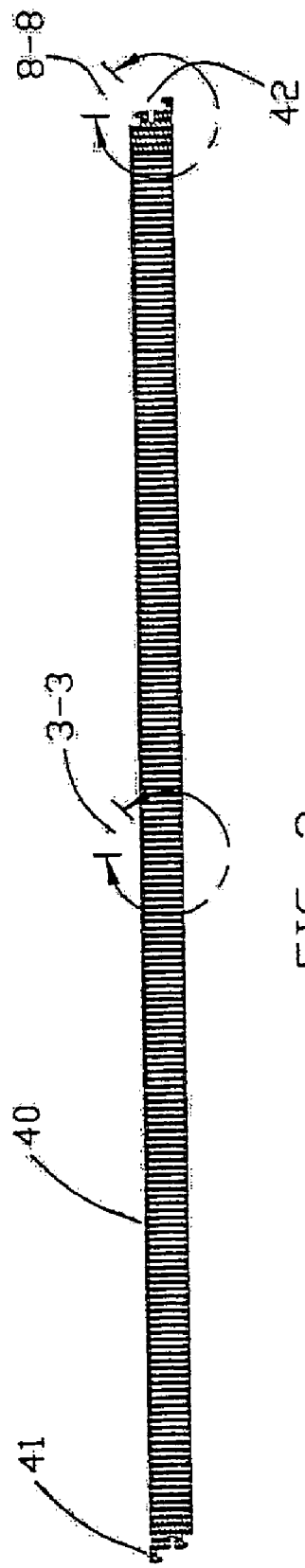
FIG. 2 is a schematic vertical cross sectional view of a pultruded composite laminate panel in a preferred embodiment, in which the clinched 3-D Z-axis fibers have been cured on the fly, showing side details. This panel would be used as a new lightweight matting surface for temporary military aircraft runway use.

FIG. 2 illustrates a vertical cross-section of one preferred embodiment. It is a cross-section of a panel 40 that is 1.5 inches thick and 48 inches wide and it will be used as a temporary runway/taxiway/or ramp for military aircraft. In remote locations, airfields must be erected quickly and be lightweight for transporting by air and handling. Panel 40 of FIG. 2 achieves these goals. Because it has been reinforced with the Z-axis groupings of fiber filaments, the panel can withstand the weight of aircraft tires, as well as heavy machinery. Since panel 40 is lightweight, at approximately 3 lbs. per square foot, it achieves a goal for the military, in terms of transportation and handling. Because 40 is pultruded automatically by the process illustrated in FIG. 1, it can be produced at an affordable price for the military. Also shown in FIG. 2 are edge connections, 41 and 42. These are identical but reversed. These allow the runway panels 40 also known as matting, to be connected and locked in place. Clearly, other applications for these composite structures exist beyond this one embodiment.

Figure 4:
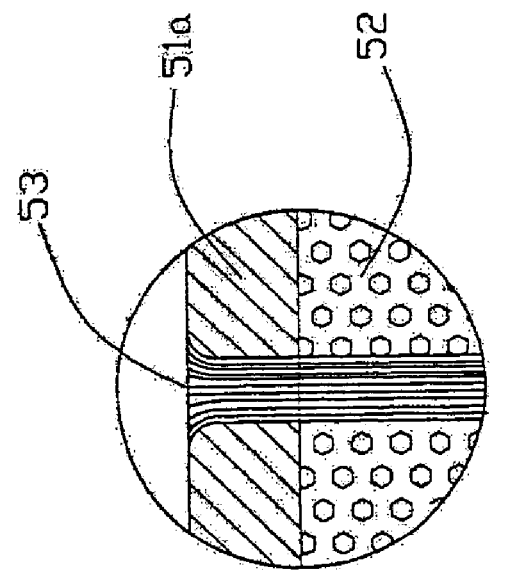
FIG. 4 is a magnified view taken along lines 4—4 of FIG. 3.
Figure 3:
FIG. 3 is a magnified view taken along lines 3—3 of FIG. 2.

FIG. 3 is a magnified view taken along lines 3—3 of FIG. 2. FIG. 3 shows the cross section of the composite laminate structure, including the upper and lower skins 51a and 51b respectfully. Core 52, which is shown as foam, clearly could be other core material such as end-grain balsa wood. Also shown are the several 3-D Z-axis groupings of fiber filaments 53, which are spaced in this embodiment every 0.25 inches apart and are approximately 0.080 inches in diameter. It can be seen from FIG. 3 that the groupings of fiber filaments 53 are clinched, or riveted to the outside of the skins, 51a and 51b. FIG. 4 is a magnified view taken along lines 4—4 of FIG. 3. FIG. 4 shows core material 52 and the upper skin section 51a and lower skin section 51b. These skin sections are approximately 0.125 inches thick in this embodiment and consists of 6 layers of X-Y stitched glass material at 24 oz. per square yard weight. The Z-axis groupings of fiber filaments 53 can be clearly seen in FIG. 4. The clinching or riveting of these filaments, which lock the skin and core together, can clearly be seen.

Figure 5:
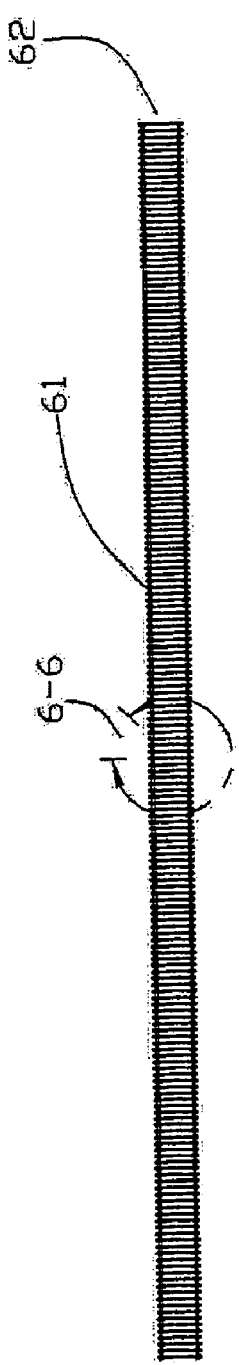
FIG. 5 is a schematic vertical cross-sectional view of the pultruded sandwich panel of the preferred embodiment, just prior to entering the pultrusion die, wherein the 3D Z-axis groupings of fiber filaments have been deposited and they are prepared for clinching and riveting in the die.
Figure 7:
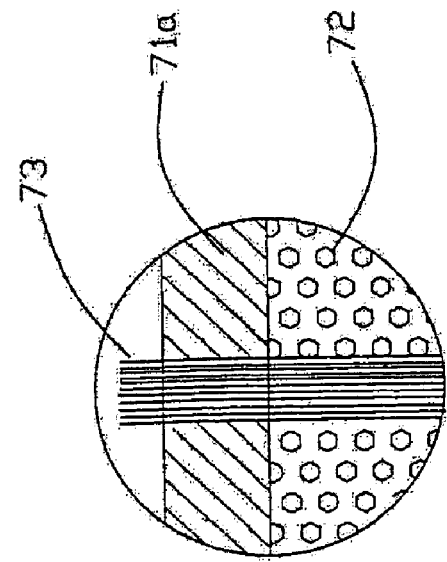
FIG. 7 is a magnified view taken along lines 7—7 of FIG. 6.
Figure 6:
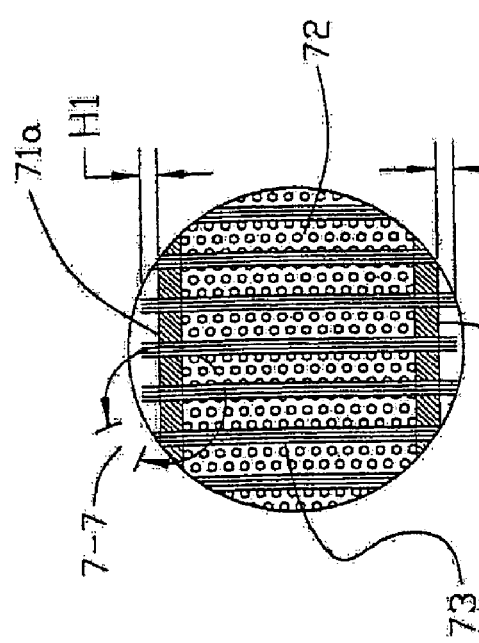
FIG. 6 is a magnified view taken along lines 6—6 of FIG. 5.

FIGS. 2,3, and 4 show the runway matting material as it would be produced in the method and apparatus of FIG. 1. The schematic section 40 in FIG. 2 is fully cured as it would be leaving pultrusion die 26. Similar drawings of these same sections are shown for the preform of the runway matting material as it would look just prior to entering pultrusion die 26 by FIGS. 5,6, and 7. FIGS. 5, 6 and 7 correlate with the preform 31 of FIG. 1. FIGS. 2,3, and 4 correlate with the perform 32 and the part 33 of FIG. 1.

FIG. 5 schematically illustrates the entire matting panel 61 as a preform. The end of the panel 62 does not show the details 42, of FIG. 2 for clarity. The lines 6—6 indicate a magnified section that is shown in FIG. 6.

FIG. 6 shows the skins 71a and 71b, the core 72 and the 3-D groupings of Z-axis fiber filaments 73. One can see the egressing of the fiber filaments above and below skins 71a and 71b by a distance H1 and H2, respectively. The lines 7—7 indicate a further magnification which is illustrated in FIG. 7.

FIG. 7 shows the preform with the core 72 and upper skin material 71a and a single group of Z-axis fiber filaments 73. Note the egressed position of the fiber filaments, which after entering the pultrusion die will be bent over and riveted, or clinched, to the composite skin. Because the skins 71a and 71b are made of X-Y material and the grouping of fiber filaments are in the normal direction to X-Y, or the Z-direction, the composite skin in the region of the 3-D grouping of fiber filaments is said to be a three dimensional composite.

Figure 8:
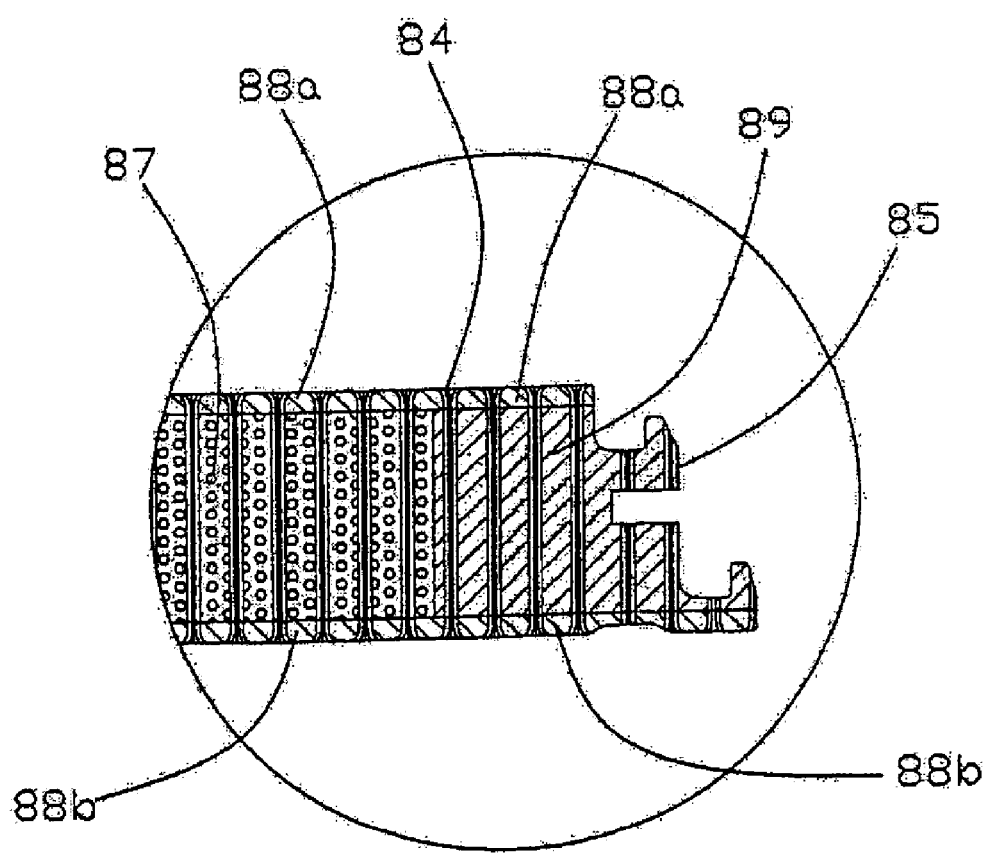
FIG. 8 is a magnified view taken along lines 8—8 of FIG. 2.

FIG. 8 is a magnified view taken along lines 8—8 of FIG. 2 and schematically depicts a core material 87, a skin material 88a and 88b and a new interior composite material 89. As stated this material 89 would consist of X-Y fiber material that is the same as the skin material 88a and 88b but is narrow in width, say 2 to 3 inches wide in this matting embodiment. The 3-D groupings of Z-axis fiber filaments 84 are deposited by the newly developed Z-axis deposition machine 24 in FIG. 1, and are operated independent of the density of the material. The 3-D groupings of fiber Z-axis filaments can be easily deposited through either the core material 87 or the higher density X-Y material 89. The interlocking connecting joint 85 can be either machined into the shape of 85 in FIG. 8 or can be pultruded and shaped by the pultrusion die. In FIG. 8 joint 85 is machined. If it were pultruded, the 3-D groupings of Z-axis fiber filaments in 85 would show riveted or clinched ends. Clearly other interlocking joints or overlaps could be used to connect matting panels.

What is claimed:

1. A composite laminate structure, comprising:
a first skin;
an internal core;
a second skin on an opposite side of the internal core from the first skin; and
a plurality of distinct bundles of Z-axis fibers that extend from the first skin to the second skin, penetrating the first skin and the second skin, wherein the bundles of Z-axis fibers include opposite ends that extend beyond the first skin and the second skin and are riveted or clinched into the first skin and the second skin to lock the first skin, the internal core, and the second skin together.

2. The composite laminate structure of claim 1, wherein the bundles of Z-axis fibers are generally perpendicular to the first skin and the second skin.

3. The composite laminate structure of claim 1, wherein the composite laminate structure includes a compressive strength over 2500 psi.

4. The composite laminate structure of claim 1, wherein the first skin and the second skin comprise an X-Y material.

5. The composite laminate structure of claim 4, wherein the core material comprises an X-Y material.

6. The composite laminate structure of claim 1, wherein the internal core comprises balsa wood.

7. The composite laminate structure of claim 1, wherein the internal core comprises urethane foam.

8. The composite laminate structure of claim 1, wherein the internal core comprises PVC foam or phenolic foam.

9. The composite laminate structure of claim 1, wherein the internal core has a density in the range of 2 lbs. per cubit foot to 16 lbs per cubit foot.

10. The composite laminate structure of claim 1, wherein the first skin and the second skin comprise layers of glass fibers.

11. The composite laminate structure of claim 1, wherein the first skin and the second skin comprise an X-Y stitched fabric.

12. The composite laminate structure of claim 1, wherein the first skin and the second skin comprise a woven roving.

13. The composite laminate structure of claim 1, wherein the first skin or the second skin comprise a reinforcing fiber, such as a carbon or aramid fiber.

14. The composite laminate structure of claim 1, wherein the first skin and the second skin comprise a reinforcing fiber, such as a carbon or aramid fiber.

15. The composite laminate structure of claim 1, further comprising machined details such as a bolt hole, edge route, milled surface, or cut-off surface.

16. The composite laminate structure of claim 1, further comprising an edge connector located on at least one edge of the structure.

17. The composite laminate structure of claim 16, wherein the structure includes a first edge surface and a second edge surface, and each edge surface further comprises an edge connector.

18. The composite laminate structure of claim 17, wherein the edge connectors allow a plurality of composite laminate structures to be connected together.

19. The composite laminate structure of claim 1, wherein the plurality of bundles of Z-axis fibers are approximately evenly spaced apart from each other.

20. The composite laminate structure of claim 1, wherein the core material further comprises a combination of X-Y fiber material and other core material.

21. The composite laminate structure of claim 20, wherein the core material is located along at least one peripheral edge of the composite laminate structure.

22. The composite laminate structure of claim 21, wherein the X-Y fiber core material is higher in density relative to the other core material.

* * * * *